United States Patent
Jia et al.

(10) Patent No.: US 10,755,260 B2
(45) Date of Patent: Aug. 25, 2020

(54) METHODS AND APPARATUSES FOR MAILING ITEMS

(71) Applicant: XIAOMI INC., Haidian District, Beijing (CN)

(72) Inventors: Weiguang Jia, Beijing (CN); Na Ma, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 581 days.

(21) Appl. No.: 15/392,140

(22) Filed: Dec. 28, 2016

(65) Prior Publication Data

US 2017/0193493 A1  Jul. 6, 2017

(30) Foreign Application Priority Data

Dec. 30, 2015 (CN) .......................... 2015 1 1020008

(51) Int. Cl.
*G06Q 20/32* (2012.01)
*G06Q 50/32* (2012.01)
*G06Q 50/28* (2012.01)
*G06Q 10/08* (2012.01)

(52) U.S. Cl.
CPC ....... *G06Q 20/3278* (2013.01); *G06Q 10/083* (2013.01); *G06Q 50/28* (2013.01); *G06Q 50/32* (2013.01)

(58) Field of Classification Search
CPC ................................................ G06Q 20/3278
See application file for complete search history.

(56) References Cited

U.S. PATENT DOCUMENTS

| | | | | |
|---|---|---|---|---|
| 6,321,992 | B1 * | 11/2001 | Knowles | G06Q 10/08 235/462.01 |
| 2006/0122851 | A1 | 6/2006 | Ryan, Jr. | |
| 2007/0050200 | A1 | 3/2007 | Kampert | |
| 2008/0168047 | A1 * | 7/2008 | Chatterjee | G06Q 10/10 |
| 2008/0302866 | A1 * | 12/2008 | Baugh | G06Q 10/08 235/375 |
| 2009/0240597 | A1 * | 9/2009 | Oswald | G06Q 10/083 705/26.1 |
| 2011/0184887 | A1 | 7/2011 | Kampert | |

(Continued)

FOREIGN PATENT DOCUMENTS

CN   102567854 A   7/2012
CN   102799973 A   11/2012

(Continued)

OTHER PUBLICATIONS

Fisher, Danny, "Post office will close window, introduce mail service kiosk," University Wire, Uloop, Inc., Carlsbad, Sep. 8, 2015.*

(Continued)

*Primary Examiner* — Nathan Erb
(74) *Attorney, Agent, or Firm* — Arch & Lake LLP

(57) ABSTRACT

A method and an apparatus are provided for mailing items in the field of network technology. The method includes: generating an access request by a mobile terminal after scanning a mailing label; sending the access request of accessing a mailing page to a server; displaying the mailing page; acquiring mailing information inputted on the mailing page, and sending the mailing information to a server.

6 Claims, 9 Drawing Sheets

(56) References Cited

U.S. PATENT DOCUMENTS

| | | | | |
|---|---|---|---|---|
| 2014/0244536 A1* | 8/2014 | Far-Hadian | ............ | G06Q 50/32 |
| | | | | 705/330 |
| 2014/0279648 A1* | 9/2014 | Whitehouse | ......... | G06Q 10/083 |
| | | | | 705/330 |
| 2015/0332206 A1* | 11/2015 | Trew | .................. | G06Q 10/0836 |
| | | | | 705/330 |
| 2015/0371187 A1* | 12/2015 | Irwin | ................. | G06Q 10/0836 |
| | | | | 705/72 |
| 2017/0132565 A1* | 5/2017 | Beadles | ............ | G06K 7/10297 |

FOREIGN PATENT DOCUMENTS

| | | |
|---|---|---|
| CN | 103729749 A | 4/2014 |
| CN | 104008613 A | 8/2014 |
| CN | 104484812 A | 4/2015 |
| CN | 104966357 A | 10/2015 |
| CN | 105577809 A | 5/2016 |
| WO | 2015183763 A2 | 12/2015 |

OTHER PUBLICATIONS

International Search Report (including English translation) and Written Opinion issued in corresponding International Application No. PCT/CN2016/097796, dated Nov. 25, 2016, 19 pages.
Extended European Search Report issued in corresponding European Application No. 16205460, dated Mar. 9, 2017, 7 pages.
EP Office Action issued in European Patent Application No. 16205460.5, dated Nov. 25, 2019, (7p).

* cited by examiner

METHODS AND APPARATUSES FOR MAILING ITEMS

CROSS-REFERENCE TO RELATED APPLICATION

This application is based upon and claims priority to Chinese Patent Application Serial No. 201511020008.5, filed on Dec. 30, 2015, the entire contents of which are incorporated herein by reference.

TECHNICAL FIELD

The present disclosure relates to a field of network technology, and more particularly to a method and an apparatus for mailing items.

BACKGROUND

With the constant development of society, electronic commerce grows swiftly and violently, which makes express delivery presents a significant rising tendency. In the related art, the process of mailing items is divided into a receiving process and a delivering process. For the receiving process, regardless of whether the delivery person picks up the items actively or the addresser goes to a sales outlet for mailing items, the addresser needs to fill a papery express waybill manually, and the delivery person needs to weigh the item and calculate the delivery fee. After that, the delivery person transports the items to be mailed to a local processing center, and the items are sent to the destination after being sorted by the local processing center. For the delivering process, after the items arrive at a processing center of the destination, the processing center will sort the items and inputs the express information thereof. After that, the items will be sent to each sales outlet by the processing center, and be delivered by the delivery person in the sales outlet.

SUMMARY

To overcome the problems in the related art, the present disclosure provides methods and apparatuses for mailing items.

According to a first aspect of the present disclosure, a method for mailing items is provided, and the method is applied in a mobile terminal. The method includes: generating an access request by the mobile terminal after scanning a mailing label; sending the access request of accessing a mailing page to a server; displaying the mailing page; and acquiring mailing information inputted on the mailing page, and sending the mailing information to the server.

According to a second aspect of the present disclosure, a method for mailing items is provided, which may be applied in a first item mailing device. The method includes: reading a mailing label and a weight of the mailing item after the mailing item is detected, to obtain mailing route information and weight data of the mailing item; uploading the mailing route information and the weight data to a server after it is determined that the mailing item is an item to be mailed according to the mailing route information, such that the server calculates mailing fees for the mailing item of at least one delivery user according to the mailing route information and the weight data and generates a delivery details page. The delivery details page includes a identity information of at least one delivery user and corresponding mailing fees.

According to a third aspect of the present disclosure, a method for mailing items is provided, and the method is applied in a server. The method includes: sending a mailing page to a mobile terminal after an access request of accessing the mailing page sent by the mobile terminal is received, in which the access request is generated and sent by the mobile terminal after scanning a mailing label; receiving mailing route information and weight data of the mailing item sent by a first item mailing device; calculating mailing fees for the mailing item of at least one delivery user according to the mailing route information and the weight data, and generating a delivery details page; and sending the delivery details page to the mobile terminal. The mailing route information is obtained by the first item mailing device through reading the mailing label of the mailing item, in which the delivery details page includes identity information of at least one delivery user and a corresponding mailing fee.

According to a fourth aspect of the present disclosure, a method for mailing items is provided, which is applied in a second item mailing device. The method includes: reading a mailing label of a mailing item after the mailing item is detected, to obtain mailing information of the mailing item, in which the mailing information at least includes mailing route information and an identification of an addressee terminal; after it is determined that the mailing item is an item to be delivered according to the mailing route information, sending a delivery request at least including an address of the second item mailing device and the identification of the addressee terminal to a server, such that the server sends a picking-item-up prompt message and -second verification information to the addressee terminal after receiving the delivery request.

According to a fifth aspect of the present disclosure, an apparatus for mailing items is provided, and the apparatus includes: a sending module, configured to send an access request of accessing a mailing page to a server, in which the access request is generated by a mobile terminal after scanning a mailing label; a displaying module, configured to display the mailing page; an acquiring module, configured to acquire mailing information inputted on the mailing page. The sending module is further configured to send the mailing information to the server such that the server writes the mailing information into the mailing label.

According to a sixth aspect of the present disclosure, an apparatus for mailing items is provided, and the apparatus includes: a reading module, configured to read a mailing label and a weight of a mailing item after the mailing item is detected, to obtain mailing route information and weight data of the mailing item; an uploading module, configured to upload the mailing route information and weight data to a server after it is determined that the mailing item is an item to be mailed according to the mailing route information, such that the server calculates mailing fees of at least one delivery user for the mailing item according to the mailing route information and the weight data and generates a delivery details page. The delivery details page includes identity information of at least one delivery user and corresponding mailing fees.

According to a seventh aspect of the present disclosure, an apparatus for mailing items is provided. The apparatus comprises: a sending module, configured to send a mailing page to a mobile terminal after an access request of accessing the mailing page sent by the mobile terminal is received, in which the access request is generated and sent by the mobile terminal after scanning a mailing label; a receiving module, configured to receive mailing route information and weight data of the mailing item sent by a first item mailing device; a calculating module, configured to calculate mailing fees of at least one delivery user for the mailing item according to the mailing route information and the weight data, and to generate a delivery details page. The sending module is further configured to send the delivery details page to the mobile terminal. The mailing route information is obtained by the first item mailing device through reading the mailing label of the mailing item, and the delivery details page includes identity information of at least one delivery user and a corresponding mailing fee.

According to an eighth aspect of the present disclosure, an apparatus for mailing items is provided. The apparatus includes: a reading module, configured to read a mailing label of a mailing item after the mailing item is detected, so as to obtain mailing information of the mailing item, in which the mailing information at least includes mailing route information and an identification of an addressee terminal; a sending module, configured to send a delivery request to a server after it is determined that the mailing item is an item to be delivered according to the mailing route information, in which the delivery request at least includes an address of the second item mailing device and the identification of the addressee terminal, such that the server sends a picking-item-up prompt message and second verification information to the addressee terminal after receiving the delivery request.

According to a ninth aspect of the present disclosure, an apparatus for mailing items is provided. The apparatus includes: a processor; a memory for storing instructions executable by the processor. The processor is configured to: send an access request of accessing a mailing page to a server, in which the access request is generated by a mobile terminal after scanning a mailing label; display the mailing page; acquire mailing information inputted on the mailing page, and send the mailing information to the server, in which the server writes the mailing information into the mailing label.

According to a tenth aspect of the present disclosure, an apparatus for mailing items is provided. The apparatus includes: a processor; a memory for storing instructions executable by the processor. The processor is configured to: read a mailing label and a weight of a mailing item after the mailing item is detected, so as to obtain mailing route information and weight data of the mailing item; upload the mailing route information and weight data to the server after it is determined that the mailing item is an item to be mailed according to the mailing route information, such that the server calculates mailing fees for the mailing item of at least one delivery user according to the mailing route information and weight data, and generates a delivery details page, in which the delivery details page includes identity information of at least one delivery user and corresponding mailing fees.

According to an eleventh aspect of the present disclosure, an apparatus for mailing items is provided. The apparatus includes: a processor; a memory for storing instructions executable by the processor. The processor is configured to: send a mailing page to a mobile terminal after an access request of accessing the mailing page sent by the mobile terminal is received, in which the access request is generated and sent by the mobile terminal after scanning a mailing label; receive mailing route information and weight data of the mailing item sent by a first item mailing device; calculate mailing fees for the mailing item of at least one delivery user according to the mailing route information and weight data, and generate a delivery details page; and send the delivery details page to the mobile terminal, in which the mailing route information is obtained by the first item mailing device through reading the mailing label of the mailing item, and the delivery details page at least includes identity information of at least one delivery user and a corresponding mailing fee.

According to a twelfth aspect of the present disclosure, an apparatus for mailing items is provided. The apparatus includes: a processor; a memory for storing instructions executable by the processor. The processor is configured to: read a mailing label of a mailing item after the mailing item is detected, so as to obtain mailing information of the mailing item, in which the mailing information at least includes mailing route information and an identification of an addressee terminal; send a delivery request to a server after it is determined that the mailing item is an item to be delivered according to the mailing route information, in which the delivery request at least includes an address of a second item mailing device and the identification of the addressee terminal, such that the server sends a picking-item-up prompt message and second verification information to the addressee terminal after receiving the delivery request.

It is to be understood that both the foregoing general description and the following detailed description are exemplary only and explanatory and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The disclosed methods and systems provide a more convenient solution to send packages using mobile terminals and item mailing devices. The mobile terminal or item mailing device may scan the mailing label and obtain the identification of the mailing label automatically. Then, the mailing information of mailing item may be inputted to the mailing label via the mobile terminal, which is convenient and efficient. The mobile terminal may automatically search the corresponding mailing address from the contacts or phone book or other applications stored locally on the mobile terminal. The mobile terminal may also search remote databases to confirm the mailing information is correct and up to date.

The solution reduces the complexity of sending packages by removing the need of handwriting the mailing information on papery express waybills. Thus, the disclosed systems realize a digitization sorting from the beginning of the mailing process. Moreover, inputted mailing information may be directly acquired by the terminal through scanning, the system may save encrypted copies locally, which is not visible to people without the encryption key. Thus, the privacy of addresser user and addressee user is protected, and the security is improved. Further, the mailing label may be reused multiple times and the consumption of paper labels may be reduced with the disclosed system.

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

Figure 1:
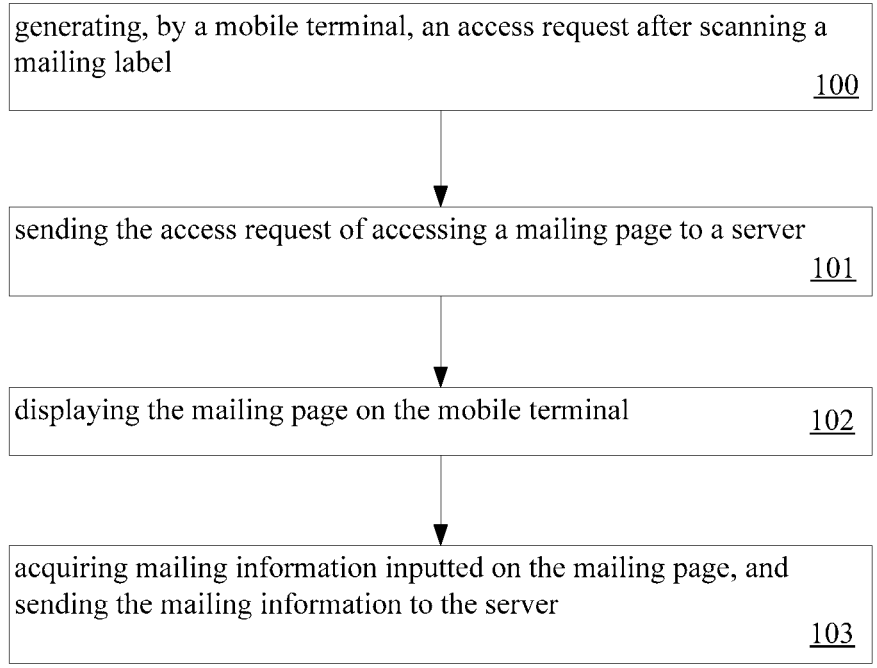
FIG. 1 is a flow chart showing a method for mailing items according to an exemplary embodiment.

FIG. 1 is a flow chart showing a method for mailing items according to an exemplary embodiment. As shown in FIG. 1, the method is applied in a mobile terminal. The method may include following steps.

In step 100, the mobile terminal generate an access request after scanning a mailing terminal.

In step 101, an access request of accessing a mailing page is sent to a server, where the access request is generated by the mobile terminal after scanning a mailing label. Here, the mailing label may be any label that includes an identification that may be scanned by the mobile terminal or other mailing devices. For example, the mailing label may include at least one of the following: a QR code, a NFC chip, etc.

In step 102, the mailing page is displayed. The mobile terminal may display the mailing page on a display of the mobile terminal. The mailing page may include a menu or other user interface that can be used to select contact information from the phone book or any other applications including addresses.

In step 103, mailing information inputted on the mailing page is acquired, and the mailing information is sent to the server. The server may then write the mailing information into a data entry corresponding to the mailing label in a database. Alternatively or additionally, the server may instruct the mobile terminal to write an encrypted copy of the mailing information into the mailing label. The mobile terminal may send the used encryption key to a second mobile terminal of the recipient identified by the mailing information.

With the method provided by embodiments of the present disclosure, by scanning the mailing label, the mailing information of mailing item may be inputted to the mailing label via a mobile terminal, which is convenient and efficient, and reduces the complexity of handwriting the mailing information by users using papery express waybills, thus realizing a digitization sorting. Moreover, inputted mailing information may only be acquired by the terminal through scanning, and thus the privacy of addresser user and addressee user is protected, and the security is improved.

In another embodiment, the method further includes: displaying a delivery details page of the mailing item, in which the delivery details page includes identity information of at least one delivery user and corresponding mailing fees, and the mailing fee is calculated by the server according to mailing route information and weight data of the mailing item after receiving the mailing route information and weight data of the mailing item sent by a first item mailing device; after a selection operation of specifying the delivery user is detected on the delivery details page, sending delivery user confirmation information to the server, such that the server sends payment information of the mailing item after receiving the delivery user confirmation information, in which the payment information at least includes account information of the specified delivery user. The method may also include: displaying a payment page of the mailing item according to the payment information.

In another embodiment, the mailing label is a Near Field Communication (NFC) label. For example, the mailing label may include an identification that is detectable using NFC. The mailing label may further include a non-transitory storage that is configured to store encrypted mailing information.

All the above alternative technical solutions may be combined randomly to form alternative embodiments of the present disclosure, which will not be elaborated herein.

Figure 2:
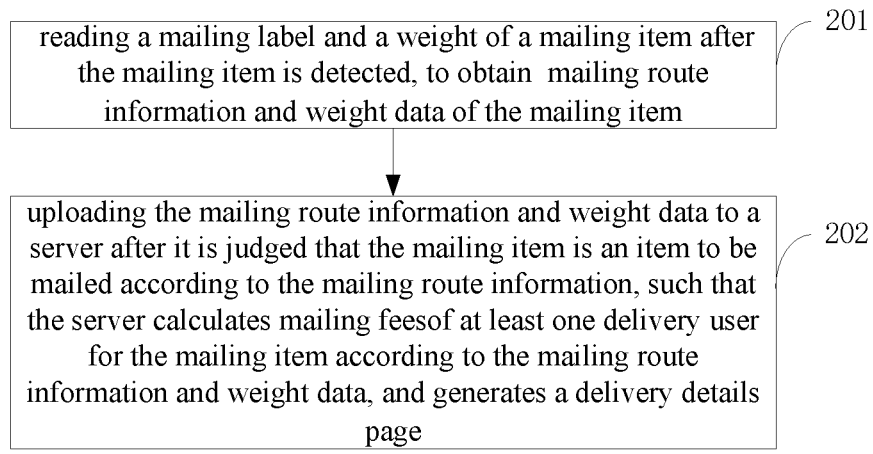
FIG. 2 is a flow chart showing a method for mailing items according to an exemplary embodiment.

FIG. 2 is a flow chart showing a method for mailing items according to an exemplary embodiment. As shown in FIG. 2, the method is applied in a first item mailing device. The method includes following steps.

In step 201, a mailing label and a weight of a mailing item is read after the mailing item is detected, so as to obtain mailing route information and weight data of the mailing item.

In step 202, the mailing route information and weight data are uploaded to a server after it is determined that the mailing item is an item to be mailed according to the mailing route information, such that the server calculates mailing fees for the mailing item of at least one delivery user according to the mailing route information and weight data, and generates a delivery details page.

The delivery details page includes identity information of at least one delivery user and corresponding mailing fees.

With the method provided by embodiments of the present disclosure, after the item is put into the cabinet, an item receiving and sending device may voluntarily read the mailing information written into the mailing label and weighs the item, and upload the mailing route information and weight data to the server actively after the mailing item is determined as an item to be mailed according to the mailing route information, such that the server calculates mailing fees of respective delivery users for the mailing item according to the mailing route information and weight data. Since a weighting operation is performed after the cabinet door is closed, human intervention is avoided, thus making the weighting result more accurate. Moreover, the mailing information may be read by voluntarily reading the mailing label, thus making it easier for the server to master the mailing status in time.

In another embodiment, the method further comprises: determining whether inputted verification information is consistent with first verification information sent by the server, after the inputted verification information is acquired; if the inputted verification information is consistent with the first verification information, controlling a cabinet door of the first item mailing device to open, and sending a first taking-item-out prompt message to the server.

All the above alternative technical solutions may be combined randomly to form alternative embodiments of the present disclosure, which will not be elaborated herein.

Figure 3:
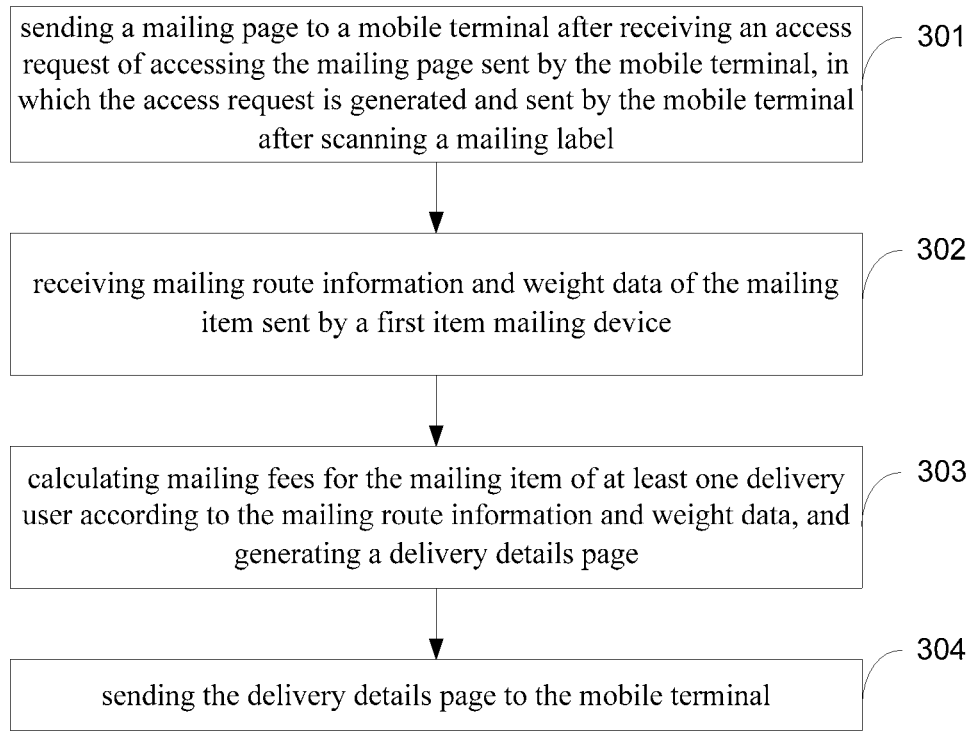
FIG. 3 is a flow chart showing a method for mailing items according to an exemplary embodiment.

FIG. 3 is a flow chart showing a method for mailing items according to an exemplary embodiment. As shown in FIG. 3, the method is applied in a server. The method includes following steps.

In step 301, a mailing page is sent to a mobile terminal after an access request of accessing the mailing page sent by a mobile terminal is received, in which the access request is generated and sent by the mobile terminal after scanning a mailing label.

In step 302, mailing route information and weight data of a mailing item sent by a first item mailing device is received.

In step 303, mailing fees of at least one delivery user for the mailing item are calculated according to the mailing route information and the weight data, and a delivery details page is generated.

In step 304, the delivery details page is sent to the mobile terminal.

In an embodiment, the mailing route information is obtained by the first item mailing device through reading the mailing label of the mailing item, and the delivery details page at least includes identity information of at least one delivery user and a corresponding mailing fee.

With the method provided by embodiments of the present disclosure, the server sends the mailing page to the mobile terminal after receiving the access request of accessing the mailing page sent by the mobile terminal, calculates mailing fees of at least one delivery user for the mailing item according to the mailing route information and weight data after receiving the mailing route information and weight data of the mailing item sent by the first item mailing device, generates the delivery details page, and sends the delivery details page to the mobile terminal. Since the mailing fees may be calculated automatically, and the mailing fees corresponding to a plurality of delivery users may be sent to the mobile terminal, it is convenient and efficient, the calculation of charges is accurate, and the user has larger selection space.

In another embodiment, the method further includes: receiving delivery user confirmation information sent by the mobile terminal, in which the delivery user confirmation information is sent by the mobile terminal after detecting a selection operation of specifying the delivery user on the delivery details page; sending payment information of the mailing item to the mobile terminal, in which the payment information at least includes account information of the specified delivery user; and sending address information of the first item mailing device and first verification information to the specified delivery user, after a payment success message returned by the mobile terminal is received.

In another embodiment, the method further includes: acquiring mailing status information of the mailing item periodically after a first taking-item-out prompt message sent by the first item mailing device is received; and sending the mailing status information to the mobile terminal and an addressee terminal.

In another embodiment, the method further includes: sending a picking-item-up prompt message and second verification information to an addressee terminal of the mailing item after a delivery request sent by a second item mailing device is received; and clearing data in the mailing label of the mailing item after a second taking-item-out prompt message sent by the second item mailing device is received.

All the above alternative technical solutions may be combined randomly to form alternative embodiments of the present disclosure, which will not be elaborated herein.

Figure 4:
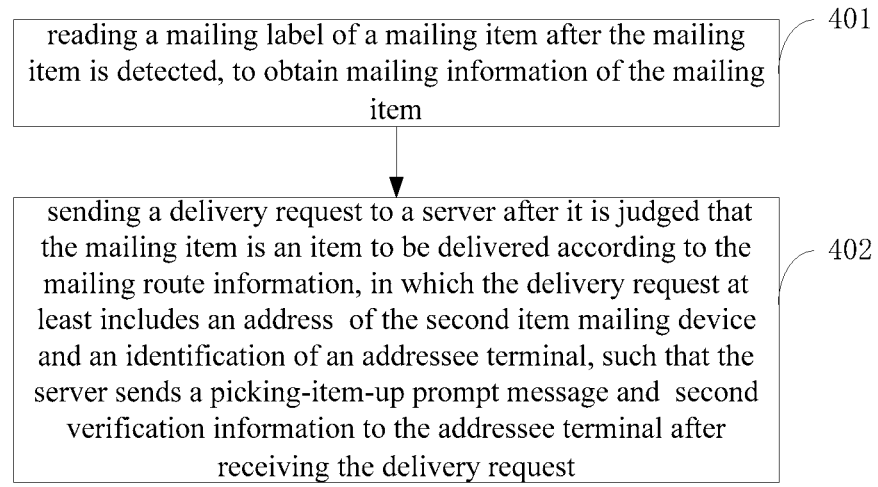
FIG. 4 is a flow chart showing a method for mailing items according to an exemplary embodiment.

FIG. 4 is a flow chart showing a method for mailing items according to an exemplary embodiment. As shown in FIG. 4, the method is applied in a second item mailing device. The method includes following steps.

In step 401, a mailing label of a mailing item is read after the mailing item is detected, so as to obtain mailing information of the mailing item.

In an embodiment, the mailing information at least includes mailing route information and an identification of an addressee terminal.

in step 402, a delivery request is sent to a server after it is determined that the mailing item is an item to be delivered according to the mailing route information, in which the delivery request at least includes an address of the second item mailing device and an identification of the addressee terminal, such that the server sends a picking-item-up prompt message and second verification information to the addressee terminal after receiving the delivery request.

With the method provided by embodiments of the present disclosure, the item receiving and sending device may voluntarily read the mailing information written into the mailing label after the item is put into the cabinet, and send the delivery request to the server actively after it is determined that the mailing item is an item to be delivered according to the mailing route information, such that the server sends the picking-item-up prompt message and second verification information to the addressee terminal after receiving the delivery request. Since the device request may be sent actively after the item arrives the destination, which makes the addressee user know arriving of the item right the first time, thus making it more intelligent, having a better effect, and improving a user experience.

In another embodiment, the method further includes: determining whether inputted verification information is consistent with second verification information sent by the server, after the inputted verification information is acquired; if the inputted verification information is consistent with the second verification information, controlling a cabinet door of the second item mailing device to open and sending a second taking-item-out prompt message to the server.

All the above alternative technical solutions may be combined randomly to form alternative embodiments of the present disclosure, which will not be elaborated herein.

Figure 5A:
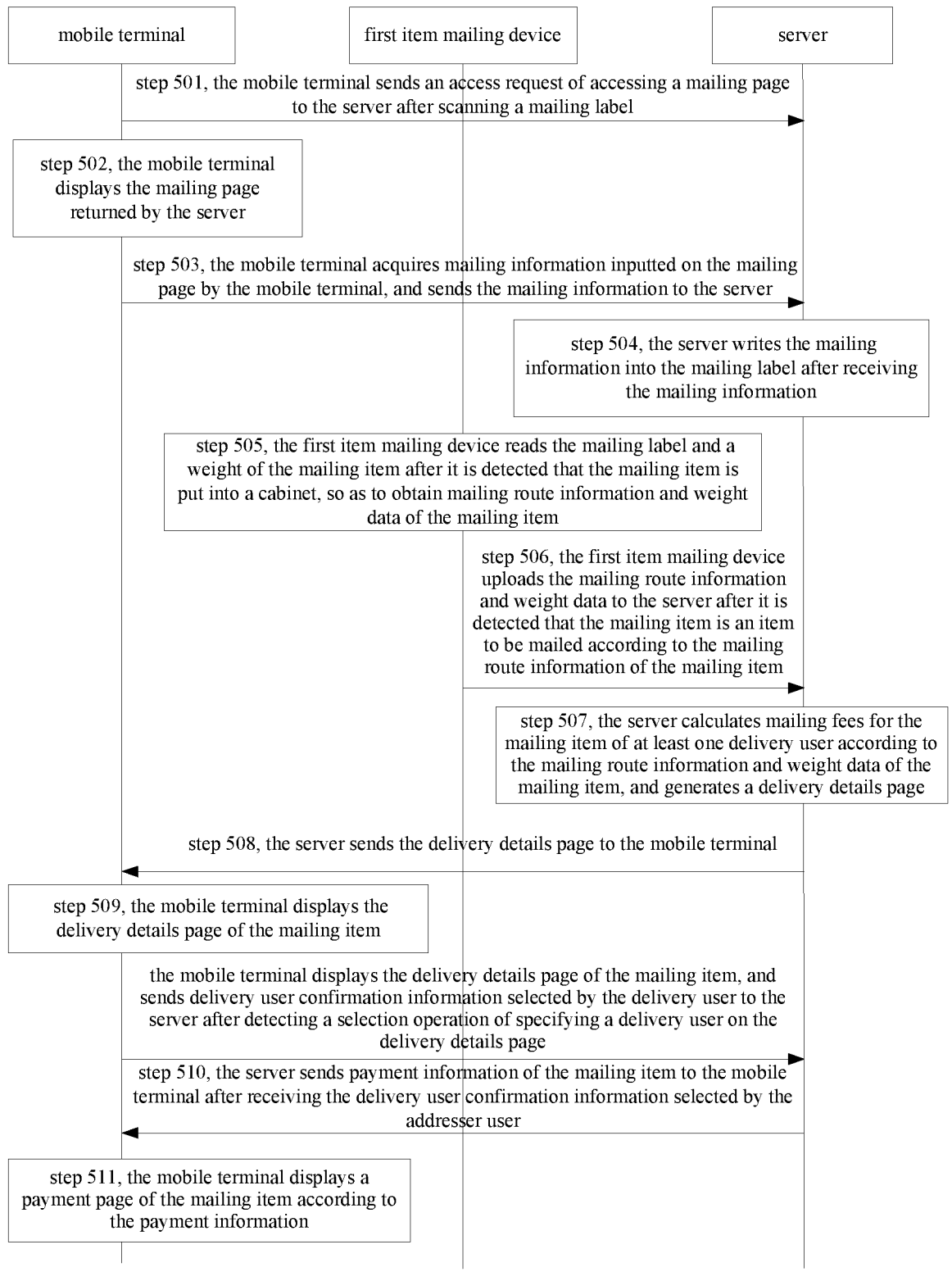
FIG. 5A is a first part of a flow chart showing a method for mailing items according to an exemplary embodiment.
Figure 5B:
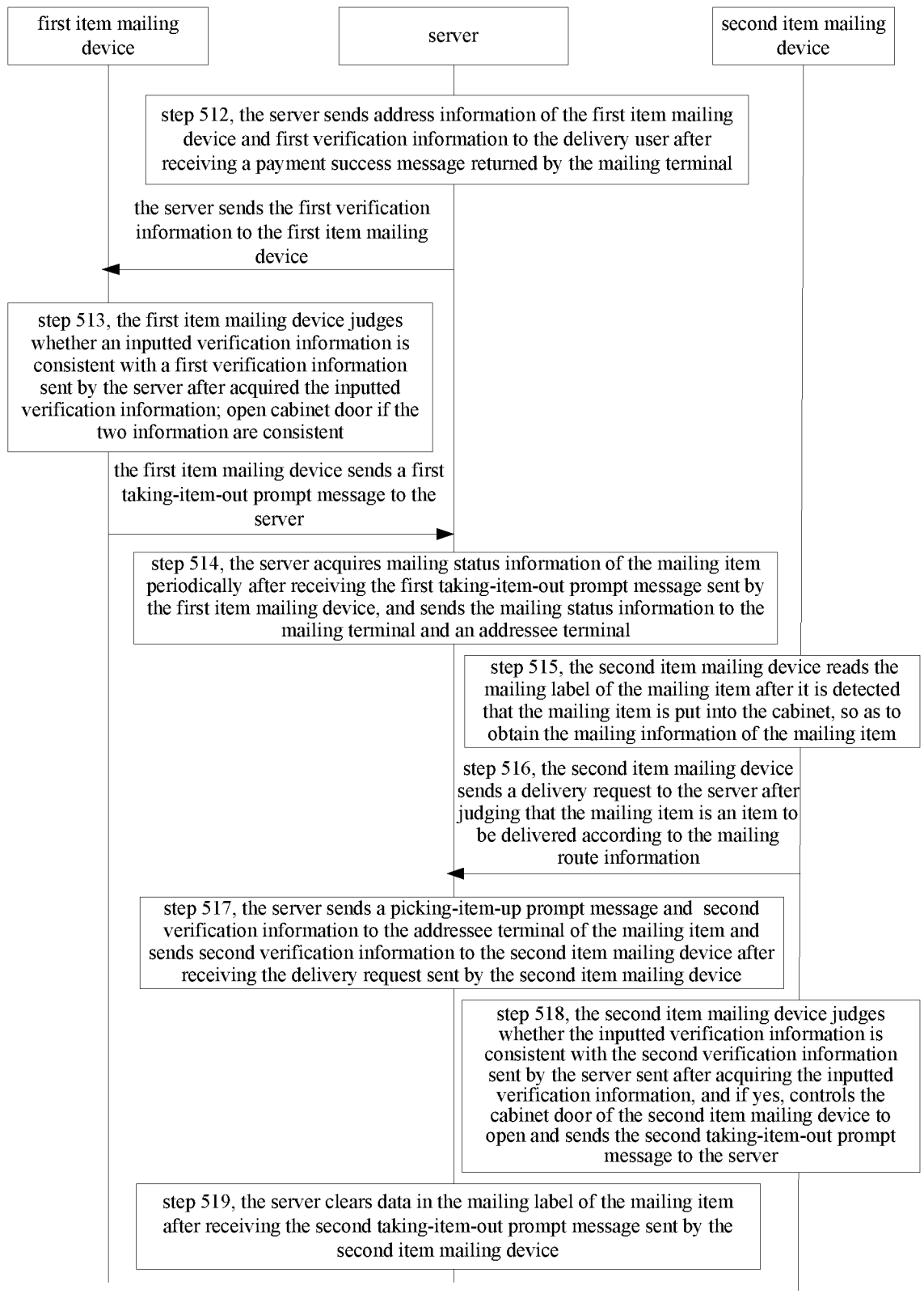
FIG. 5B is a second part of a flow chart showing the method for mailing items according to an exemplary embodiment.

FIG. 5A is a first part of a flow chart showing a method for mailing items according to an exemplary embodiment. FIG. 5B is a second part of a flow chart showing the method for mailing items according to the exemplary embodiment. The method includes following steps.

In step 501, the mobile terminal sends an access request of accessing a mailing page to the server after scanning a mailing label.

Figure 5C:
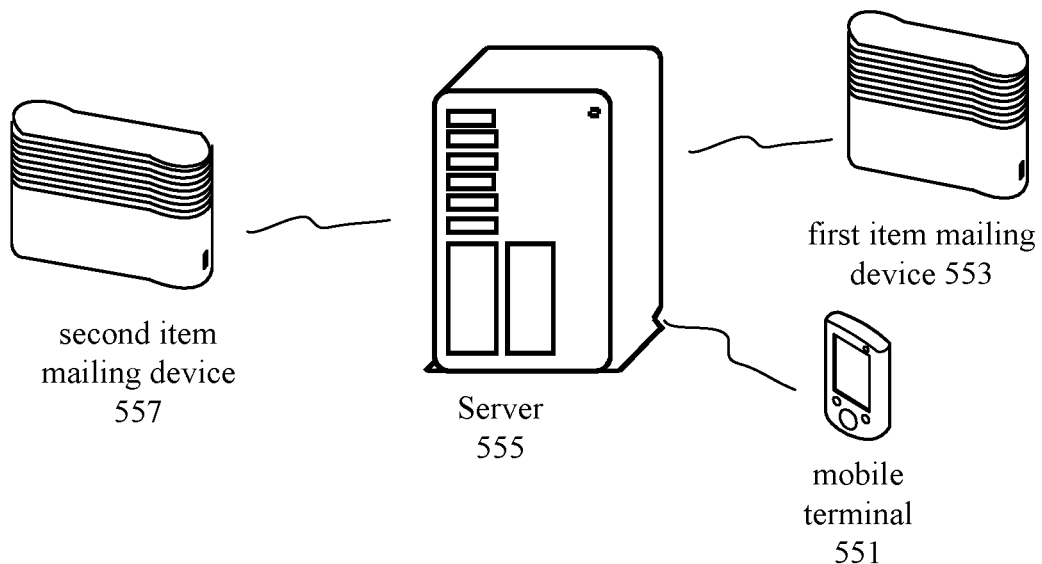
FIG. 5C is an exemplary diagram of an application in which a method for mailing items is applied.

As shown in FIG. 5C, the interactive bodies include a mobile terminal 551, a first item mailing device 553, a server 555, and a second item mailing device 557. The first item mailing device 553 may be located in a first residence area and include a plurality of cabinets to accommodate packages for mobile terminal users. The second item mailing device 557 may be located in a second residence area and include a plurality of cabinets to accommodate packages for mobile terminal users. The plurality of cabinets are controlled by the corresponding first or second mail device individually. The server 555 may communicate with the mobile terminal 551 directly or indirectly. The server 555 may have a secured communication channel to communicate with the first item mailing device 553 and the second item mailing device 557.

In FIG. 5C, the mobile terminal may be a terminal of an addresser user, such as a handheld mobile phone or a tablet PC. The item mailing device is a cabinet for placing items, and there are also mailing labeling at the place where the item mailing device is disposed. The addresser user inputs the mailing information to the mailing label by operating on the mobile terminal. The mailing label may be a reusable electronic label that includes a NFC label, which may also be referred as a NFC tag. The reusable electronic label may include additional one or more circuitries.

In embodiments of the present disclosure, the item mailing device may include a NFC card reader and a gravity sensor. The NFC card reader is configured to read the mailing information written into the mailing label of the mailing item put into the cabinet, and the gravity sensor is configured to read a weight of the mailing item.

In detail, if the addresser user activates the NFC function of the mobile terminal after getting any one of the mailing labels without data inputted therein, and scans the mailing label with the mobile terminal, the mobile terminal is triggered to send an access request of accessing the mailing page to the server. The access request may carry an identification of the mobile terminal, such as a terminal number, a terminal hardware address or a networking protocol address, which will not be specifically limited in the embodiments of the present disclosure.

In step 502, the mobile terminal displays a mailing page returned by the server.

The server returns the mailing page to the mobile terminal after receiving the access request issued by the mobile terminal. The mailing page is actually an express system page, and used by the addresser user for inputting the mailing information.

In step 503, the mobile terminal acquires the mailing information inputted by the addresser user on the mailing page, and sends the mailing information to the server.

The mailing information may include mailing route information of the mailing item, a name of an addressee user, contact information of the addressee user, a name of the addresser user, contact information of the addresser user, an address of the addresser user address, etc., which will not be specifically limited in embodiments of the present disclosure. In embodiments of the present disclosure, the input options of the above information are provided on the mailing page for the user's input. The user can also directly set common address information on the mailing page, in order to facilitate subsequent direct input of information of the addresser user.

In step 504, the server writes the mailing information into the mailing label after receiving the mailing information.

The server writes the mailing information into the mailing label previously scanned by the addresser user after receiving the mailing information sent by the addresser user. The server may encrypt the mailing information and then send the encrypted data to the mobile terminal. The mobile terminal may write the encrypted data to the mailing label using NFC. The server may use a user password obtained by the mail terminal as an encryption key to encrypt the mailing information. Alternatively or additionally, the server may use a passcode generated using a biometric character of the user to encrypt the mailing information. For example, the biometric character may include a finger print, a picture of the user's body part, etc.

For a NFC label, about ten thousands of data writings may be supported, and thus the mailing label in the present disclosure is reusable. That is, after the mailing item is delivered to the addressee user, the data in the corresponding mailing label may be wiped for the next use.

It should be understood that, through the above-described steps 501 to 504, an objective of mailing in an electronic form is realized by inputting via the addresser user's handheld mobile terminal, which replaces conventional hand-written papery express waybills. Moreover, the mailing information in the present disclosure can be seen only after scanning, thus avoiding a risk of leakage of user's privacy due to a fact that the mailing information in conventional papery express waybills can be seen by anyone. Moreover, the mailing information is in an electronic form, and thus an automatic sorting of mailing items may be realized by scanning and reading the mailing information after the mailing items arrive at a sorting office.

In step 505, the first item mailing device reads the mailing label and the weight of the mailing item after it is detected that the mailing item is put into a cabinet thereof, so as to obtain mailing route information and weight data of the mailing item.

After the mailing information is filled out, the addresser user may put the mailing item and a corresponding mailing label together into a nearby item mailing device, so that a delivery person can pick the item up later. The item mailing device has two states, i.e. with items and with no items. The item mailing device with no items may be opened by any user. After the addresser user put the mailing item and the corresponding mailing label into the first item mailing device, the built-in NFC card reader and the gravity sensor will read the mailing information and the weight automatically to obtain the mailing route information and weight data of the mailing item.

In step 506, the first item mailing device uploads the mailing route information and weight data to the server after it is detected that the mailing item is an item to be mailed according to the mailing route information of the mailing item.

After the first item mailing device determines that the location information of the place where it is located is not consistent with the mailing route information of the mailing item, the first item mailing device determines that the mailing item is an item to be mailed and uploads the mailing route information and weight data to the server, such that the mailing server may calculate the mailing fee of the mailing item according to the above-described information.

In step 507, the server calculates mailing fees of at least one delivery user for the mailing item according to the mailing route information and weight data of the mailing item, and generates a delivery details page.

In embodiments of the present disclosure, mailing quotations (**Yuan per kilogram, for example) of a plurality of delivery users are stored in the server, and a quotation list may be generated in the server. A same package delivery company generally offers different quotations on an equal weight depending on regions and traffic situations and the like. In general, the server calculates mailing fees of a plurality of express companies for the mailing item after receiving the mailing route information and weight data sent by the first item mailing device, so that the user chooses one from them. That is, the delivery details page at least includes identity information of at least one delivery user and corresponding mailing fees. Specifically, the identity information is generally a name of the package delivery company, for example, S.F. Express, STO, ZTO, YTO and so on.

In step 508, the server sends the delivery details page to the mobile terminal.

In embodiments of the present disclosure, after generating the delivery details page, the server sends the delivery details page to the mobile terminal used by the addresser user according to the mailing information of the mailing item put in the first item mailing device, so that the user can select a package delivery company.

In step 509, the mobile terminal displays the delivery details page of the mailing item, and sends delivery user confirmation information selected by the delivery user to the server after detecting a selection operation that specifies a delivery user on the delivery details page.

Besides identity information of the delivery users and corresponding mailing fees, the delivery details page may also display an option button in front of the information entry of each potential delivery user. After the user clicks any one of the option buttons, it is determined that the user selects the delivery user for delivering items. The delivery user confirmation information at least includes identity information of the specified delivery user, which will not be specifically limited in embodiments of the present disclosure.

In step 510, the server sends payment information of the mailing item to the mobile terminal after receiving the delivery user confirmation information selected by the user.

After a delivery user is selected by the addresser user, the addresser user is guided to perform a payment of the mailing fee. That is, the payment information of the mailing item is sent to the mobile terminal after the delivery user confirmation information is received. Besides account information of the specified delivery user, the payment information may also include information such as payee information, a transaction number and payment amount, which will not be specifically limited in embodiments of the present disclosure.

In step 511, the mobile terminal displays a payment page of the mailing item according to the payment information.

In embodiments of the present disclosure, after the mobile terminal receives the payment information, the mobile terminal performs a page rendering according to the payment information, and displays the payment page of the mailing item, so as to guide the user to perform a payment directly via the handheld mobile terminal.

In step 512, the server sends address information of the first item mailing device and first verification information to the specified delivery user after receiving a payment success message returned by the mobile terminal, and sends the first verification information to the first item mailing device.

After the addresser user completes the payment, then the addresser user completes the whole mailing process. For the addresser user, the whole mailing process may be completed just via the mobile terminal, which is convenient and efficient. Next, the server may inform the addresser user that the specified delivery user is coming for picking the item up. The server may inform the specified delivery user of the address information of the first item mailing device where the mailing item is put and the first verification information for opening the cabinet and picking items up. Meanwhile, the first verification information is sent to the first item mailing device, such that the first item mailing device verifies the delivery person.

In step 513, after inputted verification information is acquired, the first item mailing device determines whether the inputted verification information is consistent with the first verification information sent by the server, and controls the cabinet door of the first item mailing device to open and sends a first picking-item-up prompt message to the server if the inputted verification information is consistent with the first verification information.

When the delivery person comes to the place where the first item mailing device is put for picking items up, the first verification information sent by the server previously needs to be inputted. The verification information of the delivery person may be sent to a mobile phone of the delivery person by the specified delivery user after the server sends the first verification information to the specified delivery user. The first item mailing device may be provided with a physical input key, and determines whether the inputted verification information is consistent with the first verification information sent by the server after the inputted verification information is detected. If the inputted verification information is consistent with the first verification information, then it is proved that the real delivery person is coming for picking items up, and the cabinet door is controlled to open such that the delivery person can take the mailing item away. It should be understood that, at this moment, the mailing label and the mailing item are put together, and are taken away together. Meanwhile, to make the server learn a dynamic status of delivery of the mailing item in time, the first item mailing device will also send the first taking-item-out prompt message to the server.

In step 514, the server acquires mailing status information of the mailing item periodically after receiving the first taking-item-out prompt message sent by the first item mailing device, and sends the mailing status information to the mobile terminal and an addressee terminal.

After the mailing item is taken out from the first item mailing device by the delivery person, the server will track the status of the mailing item and send the obtained mailing status information to both the mobile terminal of the addresser user and the addressee terminal of the addressee user, so as to make the addresser user and the addressee user master the dynamic status of the item in time.

It should be noted that, the mailing item may be sent to a local processing center for sorting after being taken away by the delivery person, and may be transported after the sorting is completed. After the mailing item arrives at a processing center of the destination, an automatic sorting may be performed according to mailing label of the mailing item, and the mailing item will be sent to a corresponding sales outlet after the sorting is completed, after that, the mailing item may be put into an item mailing device near the addressee user by the delivery person, such that the addressee user can pick up the item.

In step 515, after the second item mailing device detects that the mailing item is put into the cabinet thereof, the second item mailing device reads the mailing label of the mailing item so to obtain the mailing information of the mailing item.

The delivery person puts the mailing item into the second item mailing device after opening the second item mailing device with no item, and after the second item mailing device detects that the mailing item is put into the cabinet thereof, the second item mailing device reads the mailing label of the mailing item immediately to obtain the mailing information of the mailing item.

In step 516, the second item mailing device sends a delivery request to the server after determining that the mailing item is an item to be delivered according to the mailing route information.

After determining that the location information of itself is consistent with the mailing route information of the mailing item, the second item mailing device determines that the mailing item is an item to be delivered and sends the delivery request to the server. The delivery request at least includes an address of the second item mailing device and an identification of the addressee terminal.

In step 517, the server sends a picking-item-up prompt message and second verification information to the addressee terminal of the mailing item and sends the second verification information to the second item mailing device, after receiving the delivery request sent by the second item mailing device.

The server may send the picking-item-up prompt message and the second verification information for opening the cabinet and picking items up to the addressee terminal of the mailing item according to the identification of the addressee terminal included in the delivery request. Meanwhile, the second verification information is sent to the second item mailing device, such that the second item mailing device verifies the person who picks up the item.

In step 518, after acquiring the inputted verification information, the second item mailing device determines whether the inputted verification information is consistent with the second verification information sent by the server, and controls the cabinet door of the second item mailing device to open and sends the second taking-item-out prompt message to the server if the inputted verification information is consistent with the second verification information.

When the addressee user comes to a place where the second item mailing device is disposed for picking items up, the second verification information sent by the server previously also needs to be inputted. The second item mailing device may be provided with a physical input key, and after the inputted verification information is detected, the second item mailing device determines whether the inputted verification information is consistent with the second verification information sent by the server. If the inputted verification information is consistent with the second verification information, then it is proved that the real addressee user is coming for picking item up, and the cabinet door is controlled to open such that the addressee user take the mailing item away. It should be noted that, at this moment, the addressee user is asked to separate the mailing label from the mailing item, and takes the mailing item only away. Meanwhile, in order to make the server learn the dynamic status of delivery of the mailing item in time, the second item mailing device will further sends a second taking-item-out prompt message to the server.

In step 519, the server clears data in the mailing label of the mailing item after receiving the second taking-item-out prompt message sent by the second item mailing device. For example, the server may remove the content in the data entry corresponding to the mailing label in the database. Additionally or alternatively, the server may move the content from a data entry under "current mailing information" to a data entry under "previous mailing information" so that the server can keep a record of one or more previous mailing information associated with the mailing label.

For the mailing label provided by embodiments of the present disclosure, about ten thousands of data writings may be supported, and therefore the mailing label in the present disclosure is reusable. That is, after the mailing item is delivered to the addressee user, the server may wipe data in the corresponding mailing label for the next use.

With the method provided by embodiments of present disclosure, inputting the mailing information of the mailing item into a mailing label via a mobile terminal and a server may be realized by scanning the mailing label via the mobile terminal, which is convenient and efficient, and reduces the complexity of handwriting mailing information by users using papery express waybills, thus realizing a digitization sorting. Moreover, the inputted mailing information may only be acquired by the terminal scanning, and thus the privacy of the addresser user and the addressee user is protected, and the security is improved.

After the item is put into the cabinet, the first item mailing device may read the mailing information written into the mailing label and weigh the item voluntarily, and after determining that the mailing item is the item to be mailed according to the mailing route information, uploads the mailing route information and weight data to the server actively, such that the server calculates mailing fees for the mailing item of respective delivery users according to the mailing route information and weight data. Since the weighting operation is performed after the cabinet door is closed, human intervention is avoided, and the weighting result is more accurate. Moreover, the mailing information is obtained by reading the mailing label voluntarily, and thus the server may master the mailing status in time. In addition, since the server sends the mailing fees corresponding to a plurality of delivery users to the mobile terminal, the user has greater selection space.

After the item arrives at the destination, the second item receiving and sending device may read the mailing information written into the mailing label voluntarily, and sends the delivery request to the server actively after it is determined that the mailing item is an item to be delivered according to the mailing route information, such that the server sends a picking-item-up prompt message and second verification information to the addressee terminal after receiving the delivery request. Since the delivery request may be sent actively after the item arrives at the destination, the addressee user can learn the arriving of the item right the first time, which is more intelligent, and has a better effect, and the user experience degree is more excellent.

Figure 6:
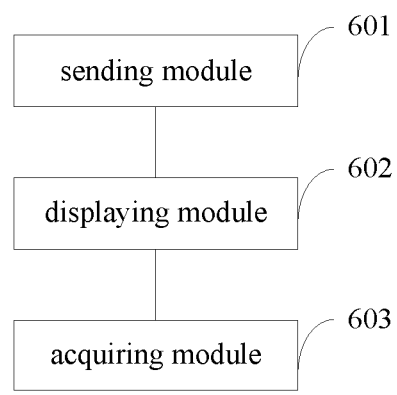
FIG. 6 is a block diagram showing an apparatus for mailing items according to an exemplary embodiment.

FIG. 6 is a block diagram showing an apparatus for mailing items according to an exemplary embodiment. Referring to FIG. 6, the apparatus includes a sending module 601, a displaying module 602 and an acquiring module 603.

The sending module 601 is configured to send an access request of accessing a mailing page to a server, in which the access request is generated by a mobile terminal after scanning a mailing label.

The displaying module 602 is configured to display the mailing page.

The acquiring module 603 is configured to acquire mailing information inputted on the mailing page.

The sending module 601 is further configured to send the mailing information to the server such that the server writes the mailing information into the mailing label.

In another embodiment, the displaying module 602 is further configured to display a delivery details page of the mailing item, in which the delivery details page includes identity information of at least one delivery user and corresponding mailing fees, and the mailing fee is calculated by the server according to mailing route information and weight data of the mailing item after receiving the mailing route information and the weight data of the mailing item sent by a first item mailing device;

the sending module 601 is further configured to send delivery user confirmation information to the server after a selection operation of specifying the delivery user is detected on the delivery details page, such that the server sends payment information of the mailing item after receiving the delivery user confirmation information, in which the payment information at least includes account information of the specified delivery user;

the displaying module 602 is further configured to display a payment page of the mailing item according to the payment information.

In another embodiment, the mailing label is a NFC label.

With the apparatus provided by embodiments of the present disclosure, by scanning the mailing label, the mailing information of mailing item may be inputted to the mailing label via a mobile terminal, which is convenient and efficient, and reduces the complexity of handwriting the mailing information by users using papery express waybills, thus realizing a digitization sorting. Moreover, inputted mailing information may only be acquired by the terminal through scanning, and thus the privacy of addresser user and addressee user is protected, and the security is improved.

Figure 7:
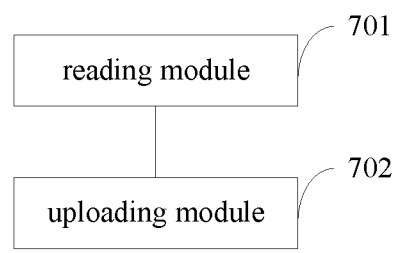
FIG. 7 is a block diagram showing an apparatus for mailing items according to an exemplary embodiment.

FIG. 7 is a block diagram showing an apparatus for mailing items according to an exemplary embodiment. Referring to FIG. 7, the apparatus includes a reading module 701 and an uploading module 702.

The reading module 701 is configured to read a mailing label and a weight of the mailing item after the mailing item is detected, to obtain mailing route information and weight data of the mailing item.

The uploading module 702 is configured to upload the mailing route information and weight data to a server after it is determined that the mailing item is an item to be mailed according to the mailing route information, such that the server calculates mailing fees of at least one delivery user for the mailing item according to the mailing route information and weight data, and generates a delivery details page.

The delivery details page includes identity information of at least one delivery user and corresponding mailing fees.

Figure 8:
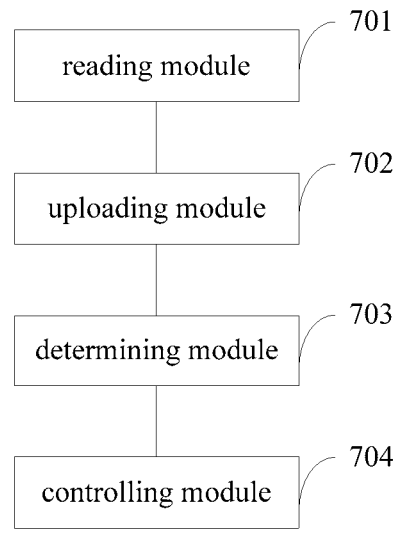
FIG. 8 is a block diagram showing an apparatus for mailing items according to an exemplary embodiment.

In another embodiment, referring to FIG. 8, the apparatus further includes a determining module 703 and a controlling module 704.

The determining module 703 is configured to determine whether inputted verification information is consistent with first verification information sent by the server, after the inputted verification information is acquired.

The controlling module 704 is configured to control a cabinet door of a first item mailing device to open, if the inputted verification information is consistent with the first verification information.

The uploading module 702 is further configured to send a first taking-item-out prompt message to the server.

With the apparatus provided by embodiments of the present disclosure, after the item is put into the cabinet, an item receiving and sending device may voluntarily read the mailing information written into the mailing label and weighs the item, and upload the mailing route information and weight data to the server actively after the mailing item is determined as an item to be mailed according to the mailing route information, such that the server calculates mailing fees of respective delivery users for the mailing item according to the mailing route information and weight data. Since a weighting operation is performed after the cabinet door is closed, human intervention is avoided, thus making the weighting result more accurate. Moreover, the mailing information may be read by voluntarily reading the mailing label, thus making it easier for the server to master the mailing status in time.

Figure 9:
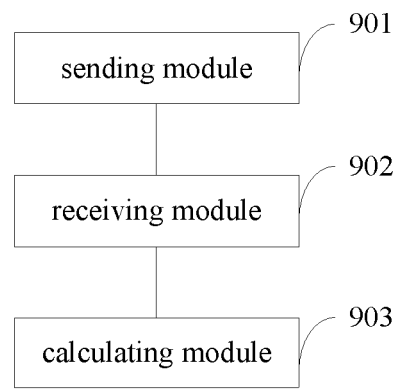
FIG. 9 is a block diagram showing an apparatus for mailing items according to an exemplary embodiment.

FIG. 9 is a block diagram showing an apparatus for mailing items according to an exemplary embodiment. Referring to FIG. 9, the apparatus includes a sending module 901, a receiving module 902 and a calculating module 903.

The sending module 901 is configured to send a mailing page to a mobile terminal after an access request of accessing the mailing page sent by the mobile terminal is received, in which the access request is generated and sent by the mobile terminal after scanning a mailing label.

The receiving module 902 is configured to receive mailing route information and weight data of the mailing item sent by a first item mailing device.

The calculating module 903 is configured to calculate mailing fees of at least one delivery user for the mailing item according to the mailing route information and the weight data, and to generate a delivery details page.

The sending module 901 is further configured to send the delivery details page to the mobile terminal.

The mailing route information is obtained by the first item mailing device through reading the mailing label of the mailing item, and the delivery details page at least includes identity information of at least one delivery user and a corresponding mailing fee.

In another embodiment, the receiving module 902 is further configured to delivery user confirmation information sent by the mobile terminal, in which the delivery user confirmation information is sent by the mobile terminal after detecting a selection operation of specifying the delivery user on the delivery details page; the sending module 901 is further configured to send payment information of the mailing item to the mobile terminal, in which the payment information at least includes account information of the specified delivery user;

the sending module 901 is further configured to send address information of the first item mailing device and first verification information to the specified delivery user after a payment success message returned by the mobile terminal is received.

Figure 10:
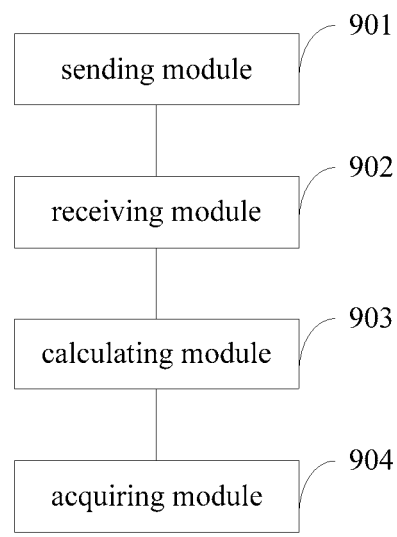
FIG. 10 is a block diagram showing an apparatus for mailing items according to an exemplary embodiment.

In another embodiment, referring to FIG. 10, the apparatus further includes an acquiring module 904.

The acquiring module 904 is configured to acquire mailing status information of the mailing item periodically after a first taking-item-out prompt message sent by the first item mailing device is received;

the sending module 901 is further configured to send the mailing status information to the mobile terminal and an addressee terminal.

Figure 11:
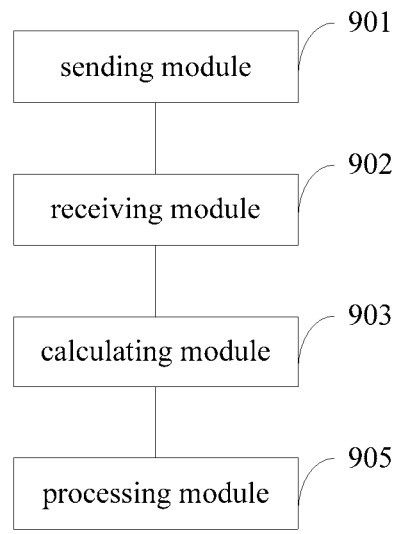
FIG. 11 is a block diagram showing an apparatus for mailing items according to an exemplary embodiment.

In another embodiment, referring to FIG. 11, the apparatus further comprises a processing module 905.

The sending module 901 is further configured to send a picking-item-up prompt message and second verification information to the addressee terminal of the mailing item after a delivery request sent by the second item mailing device is received. The processing module 905 is configured to clear data in the mailing label of the mailing item after a second taking-item-out prompt message sent by the second item mailing device is received. Alternatively or additionally, the processing module 905 may send instructions to clear data in the mailing label.

With the apparatus provided by embodiments of the present disclosure, the server sends the mailing page to the mobile terminal after receiving the access request of accessing the mailing page sent by the mobile terminal, and calculates mailing fees for the mailing item of at least one delivery user according to the mailing route information and weight data after receiving the mailing route information and weight data of the mailing item sent by the first item mailing device, and generates the delivery details page, and sends the delivery details page to the mobile terminal. Since the mailing fees may be calculated voluntarily, and mailing fees corresponding to a plurality of delivery users are sent to the mobile terminal, which is convenient and efficient, and makes the calculation of charges more accurate, thus making the selection space of user greater. Moreover, the mailing information may be written into and wiped from the mailing label, thus saving the trouble of handwriting mailing information on papery express waybills, protecting the personal privacy of users, and also increasing the use ratio of mailing labels.

Figure 12:
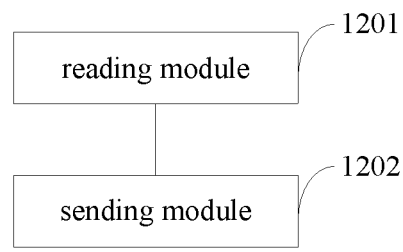
FIG. 12 is a block diagram showing an apparatus for mailing items according to an exemplary embodiment.

FIG. 12 is a block diagram showing an apparatus for mailing items according to an exemplary embodiment. Referring to FIG. 12, the apparatus includes a reading module 1201 and a sending module 1202.

The reading module 1201 is configured to read a mailing label of a mailing item after the mailing item is detected, so as to obtain mailing information of the mailing item, in which the mailing information at least includes mailing route information and an identification of an addressee terminal.

The sending module 1202 is configured to send a delivery request to a server after it is determined that the mailing item is an item to be delivered according to the mailing route information, in which the delivery request at least includes an address of the second item mailing device and the identification of the addressee terminal, such that the server sends a picking-item-up prompt message and second verification information to the addressee terminal after receiving the delivery request.

Figure 13:
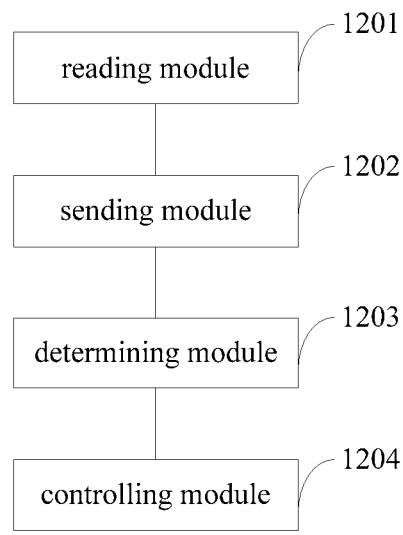
FIG. 13 is a block diagram showing an apparatus for mailing items according to an exemplary embodiment.

In another embodiment, referring to FIG. 13, the apparatus further includes a determining module 1203 and a controlling module 1204.

The determining module 1203 is configured to determine whether inputted verification information is consistent with second verification information sent by the server, after the inputted verification information is acquired.

The controlling module 1204 is configured to control a cabinet door of the second item mailing device to open, if the inputted verification information is consistent with the second verification information.

The sending module 1202 is further configured to send a second taking-item-out prompt message to the server.

with the apparatus provided by embodiments of the present disclosure, the mailing information written into the mailing label may be read voluntarily after the item is put into the cabinet, and the delivery request is sent to the server actively after it is determined that the mailing item is the item to be delivered according to the mailing route information, and the server sends a picking-item-up prompt message and second verification information to the addressee terminal after receiving the delivery request. Since the delivery request may be sent actively after the item arrives at the destination, thus making the addressee user learn the arriving of the item right the first time, which is more intelligent, and has a better effect, and improves the user experience.

With respect to the apparatus in the above embodiments, the specific manners for performing operations for individual modules therein have been described in detail in embodiments regarding the methods, which will not be elaborated herein.

Figure 14:
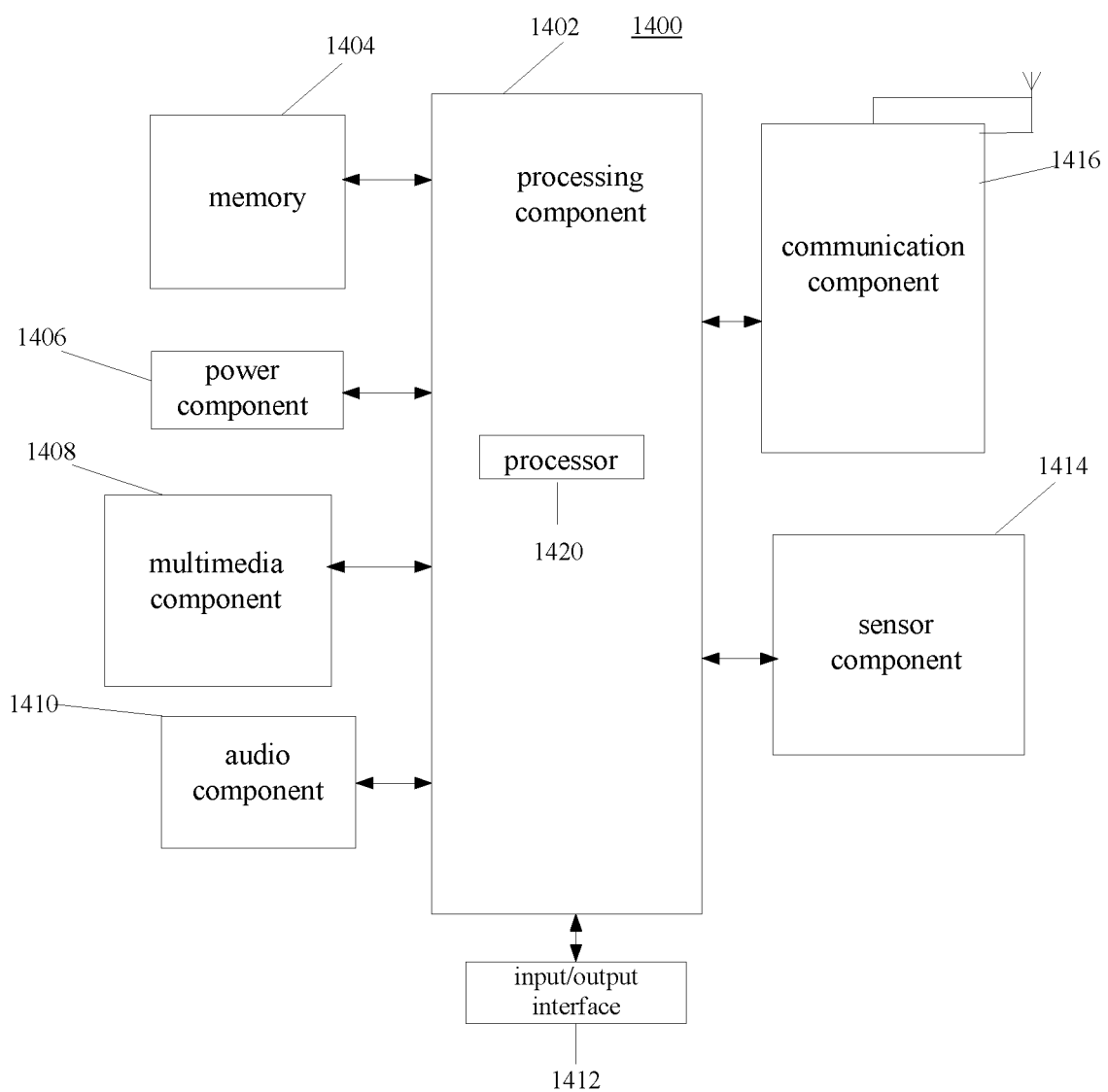
FIG. 14 is a block diagram showing an apparatus for mailing items according to an exemplary embodiment.

FIG. 14 is a block diagram showing an apparatus 1400 for mailing items according to an exemplary embodiment. For example, the apparatus 1400 may be a mobile telephone, a computer, a digital broadcasting terminal, a message transceiver, a game console, a tablet device, a medical facility, a fitness equipment, a personal digital assistant etc.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a complementary metal-oxide-semiconductor (CMOS) or charge-coupled device (CCD) image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as WiFi, 2G, or 3G or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the apparatus 1400 may be implemented with one or more circuitries, which include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 300 may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer readable storage medium including instructions, such as included in the memory 704, executable by the processor 720 in the device 700, for performing the above-described methods for mailing items. For example, the non-transitory computer-readable storage medium may be a ROM, a RAM, a CD-ROM, a magnetic tape, a floppy disc, an optical data storage device, and the like.

Figure 15:
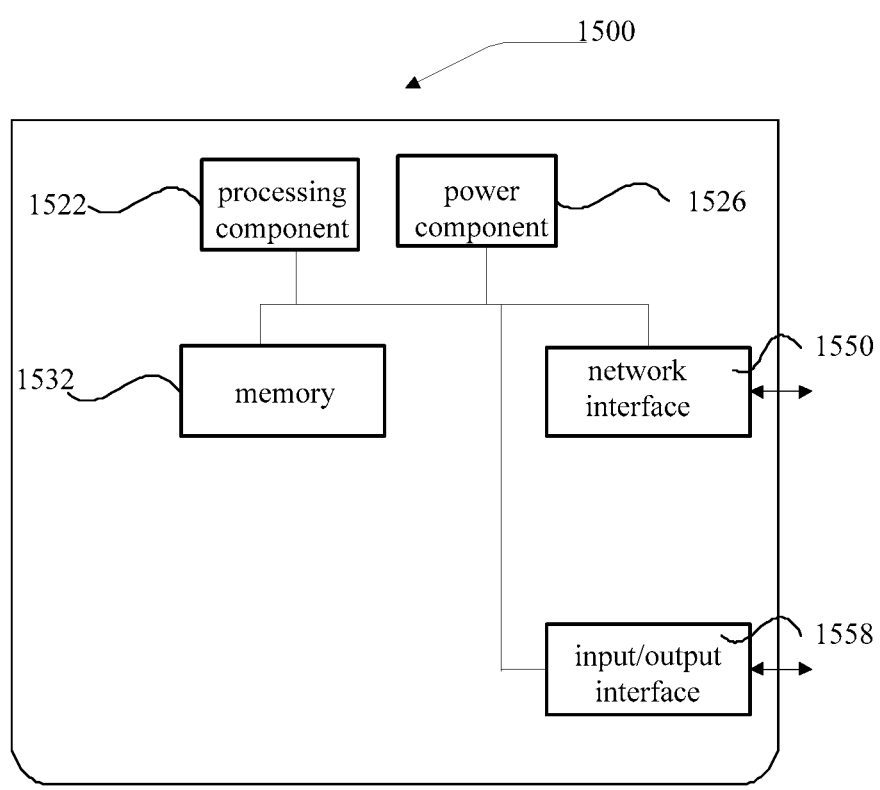
FIG. 15 is a block diagram showing an apparatus for mailing items according to an exemplary embodiment.

FIG. 15 is a block diagram of an apparatus 1500 for mailing items according to an exemplary embodiment. For example, the apparatus 1500 may be provided as a server. Referring to FIG. 15, the apparatus 1500 includes a processing component 1522, and further includes one or more processor, and a memory resource that represented by the memory 1532 for storing instructions that can be executed by the processing component 1522, such as an application program. The application program that stored in memory 1532 may include one or more modules each corresponding to a group of instructions. In addition, the processing component 1522 is configured to execute the instructions to execute the above-described method for mailing items.

The apparatus 1500 may further include a power component 1526 configured to execute the power management of the apparatus 1500; one or more wired or wireless network interfaces 1550 configured to connect the apparatus 1500 to the network; and an input/output interface 1558. The apparatus 1500 may operate operating systems that stored in the memory 1532, such as Windows Server™, Mac OS X™, Unix™, Linux™, FreeBSD™ and so on.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:
   receiving, by a server, an access request of accessing a mailing page, wherein the access request is generated by scanning a mailing label using a mobile terminal;
   sending, by the server, the mailing page to the mobile terminal;
   receiving mailing route information and weight data of a mailing item sent by a first item mailing device comprising a first computing system, a first cabinet, a wireless-tag and/or optical reader, and a gravity sensor which measures the weight data in response to the mailing item being stored in the first cabinet;
   calculating mailing fees for the mailing item of at least one delivery service provider according to the mailing route information and the weight data, and generating a delivery details page, wherein the delivery details page comprises identity information of a potential delivery service provider and a corresponding mailing fee;
   sending the delivery details page to the mobile terminal;
   receiving delivery service provider confirmation information sent by the mobile terminal, wherein the delivery service provider confirmation information is sent by the mobile terminal after detecting a selection operation that selects a delivery service provider that was included on the delivery details page;
   sending payment information of the mailing item to the mobile terminal, wherein the payment information comprises account information of the selected delivery service provider; and
   sending address information of the first item mailing device and first verification information to the selected delivery service provider after a payment success message returned by the mobile terminal is received,
   wherein the mailing route information is obtained by the first item mailing device through reading the mailing label of the mailing item.

2. The method according to claim 1, further comprising:
   acquiring mailing status information of the mailing item periodically after a first taking-item-out prompt message sent by the first item mailing device is received; and sending the mailing status information to the mobile terminal and an addressee terminal.

3. The method according to claim 1, further comprising:
   sending a picking-item-up prompt message and second verification information to an addressee terminal for the mailing item after a delivery notification sent by a second item mailing device is received, the second item mailing device comprising a second computing system and a second cabinet; and
   clearing data in the mailing label of the mailing item after a second taking-item-out prompt message sent by the second item mailing device is received.

4. An apparatus, comprising:
   a processor; and
   a memory for storing instructions executable by the processor;
   wherein the apparatus is configured to:
   send a mailing page to a mobile terminal after an access request of accessing the mailing page sent by the mobile terminal is received, wherein the access request is generated and sent by the mobile terminal after scanning a mailing label;
   receive mailing route information and weight data of a mailing item sent by a first item mailing device comprising a first computing system, a first cabinet, a wireless-tag and/or optical reader, and a gravity sensor which measures the weight data in response to the mailing item being stored in the first cabinet;
   calculate mailing fees for the mailing item of at least one delivery service provider according to the mailing route information and the weight data, and generate a delivery details page, wherein the delivery details page comprises identity information of a potential delivery service provider and a corresponding mailing fee;
   send the delivery details page to the mobile terminal;
   receive delivery service provider confirmation information sent by the mobile terminal, wherein the delivery service provider confirmation information is sent by the mobile terminal after detecting a selection operation that selects a delivery service provider that was included on the delivery details page;
   send payment information of the mailing item to the mobile terminal, wherein the payment information comprises account information of the selected delivery service provider; and
   send address information of the first item mailing device and first verification information to the selected delivery service provider after a payment success message returned by the mobile terminal is received,
   wherein the mailing route information is obtained by the first item mailing device through reading the mailing label of the mailing item.

5. The apparatus according to claim 4, wherein the apparatus is further configured to:
   acquire mailing status information of the mailing item periodically after a first taking-item-out prompt message sent by the first item mailing device is received; and
   send the mailing status information to the mobile terminal and an addressee terminal.

6. The apparatus according to claim 4, wherein the apparatus is further configured to:
   send a picking-item-up prompt message and second verification information to an addressee terminal for the mailing item after a delivery notification sent by a second item mailing device is received, the second item mailing device comprising a second computing system and a second cabinet; and
   clear data in the mailing label of the mailing item after a second taking-item-out prompt message sent by the second item mailing device is received.

\* \* \* \* \*